(12) United States Patent
Rosenblatt et al.

(10) Patent No.: US 7,959,065 B2
(45) Date of Patent: Jun. 14, 2011

(54) CUSTOM CONTENT GIFT CARDS

(75) Inventors: Michael Rosenblatt, Campbell, CA (US); Gloria Lin, San Ramon, CA (US); Taido Lantz Nakajima, Cupertino, CA (US); Sean Anthony Mayo, Dover, NH (US); Andrew Hodge, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 12/286,342

(22) Filed: Sep. 30, 2008

(65) Prior Publication Data
US 2010/0078474 A1 Apr. 1, 2010

(51) Int. Cl.
*G06F 17/00* (2006.01)
(52) U.S. Cl. .................................... 235/375; 235/492
(58) Field of Classification Search ............... 235/380, 235/375, 492; 705/52
See application file for complete search history.

(56) References Cited

U.S. PATENT DOCUMENTS

| | | | |
|---|---|---|---|
| 7,334,728 B2 | 2/2008 | Williams | |
| 7,376,591 B2 | 5/2008 | Owens | |
| 7,464,050 B1 | 12/2008 | Deaton et al. | |
| 7,818,262 B2 * | 10/2010 | Kavuri et al. | 705/59 |
| 2002/0082931 A1 | 6/2002 | Siegel et al. | |
| 2002/0178088 A1 | 11/2002 | Lurie et al. | |
| 2003/0004815 A1 * | 1/2003 | Sakai et al. | 705/26 |
| 2004/0203352 A1 | 10/2004 | Hall et al. | |
| 2005/0116027 A1 * | 6/2005 | Algiene et al. | 235/380 |
| 2005/0125343 A1 | 6/2005 | Mendelovich | |
| 2005/0131871 A1 | 6/2005 | Howard et al. | |
| 2005/0197960 A1 | 9/2005 | Daum et al. | |
| 2005/0203849 A1 | 9/2005 | Benson | |
| 2005/0216417 A1 | 9/2005 | Risan et al. | |
| 2006/0111944 A1 * | 5/2006 | Sirmans et al. | 705/3 |
| 2006/0149681 A1 | 7/2006 | Meisner | |
| 2006/0173784 A1 | 8/2006 | Marples et al. | |
| 2006/0243609 A1 * | 11/2006 | Cole et al. | 206/232 |

(Continued)

FOREIGN PATENT DOCUMENTS
EP 1331561 A2 7/2003
(Continued)

OTHER PUBLICATIONS

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

*Primary Examiner* — Daniel A Hess
*Assistant Examiner* — Tabitha Chedekel
(74) *Attorney, Agent, or Firm* — Fletcher Yoder PC (57) ABSTRACT

There is provided a customized gift card and methods for customizing the gift card with buyer-selected downloadable content. A buyer may associate pre-purchased downloadable content with a gift card such that the card is "preloaded" for a recipient. The recipient may then redeem the customized gift card and download or access the pre-purchased content. The customized gift card may also include a buyer-selected image and/or personalized message on the face of the card. Alternatively, the customized gift card may have a generic design. Various methods are provided for producing the cards and selecting the downloadable content, including purchasing the card online and having it delivered; buying a generic card and associating content with it online; and purchasing and preloading the card at a dispenser, or kiosk.

24 Claims, 10 Drawing Sheets

U.S. PATENT DOCUMENTS

| | | |
|---|---|---|
| 2006/0271489 A1 | 11/2006 | Flanagan et al. |
| 2007/0038577 A1* | 2/2007 | Werner et al. .................. 705/59 |
| 2007/0150369 A1 | 6/2007 | Zivin |
| 2007/0198419 A1 | 8/2007 | Park et al. |
| 2007/0265971 A1 | 11/2007 | Smalley |
| 2007/0271188 A1 | 11/2007 | Burkholder |
| 2007/0278290 A1 | 12/2007 | Messerges et al. |
| 2008/0005195 A1 | 1/2008 | Li |
| 2008/0052241 A1 | 2/2008 | Chaplin |
| 2008/0052243 A1 | 2/2008 | Narayanaswami et al. |
| 2008/0059323 A1 | 3/2008 | Chang et al. |
| 2008/0148067 A1 | 6/2008 | Sitrick et al. |
| 2008/0154734 A1 | 6/2008 | Fernandez et al. |
| 2008/0167994 A1 | 7/2008 | Li et al. |
| 2008/0313084 A1 | 12/2008 | Socolofsky |

FOREIGN PATENT DOCUMENTS

| | | |
|---|---|---|
| WO | 02/08863 A2 | 1/2002 |
| WO | 2008/112497 A1 | 9/2008 |
| WO | 2009/0018255 A1 | 2/2009 |

* cited by examiner

CUSTOM CONTENT GIFT CARDS

BACKGROUND

1. Technical Field

The present disclosure relates generally to gift cards and, more particularly, to gift cards associated with customizable content and/or designs.

2. Description of the Related Art

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Cards which carry a monetary or credit value have become a common form of gift. These gift cards may be purchased, for example, at retail stores or on the internet, and given to the recipient for redemption. Traditionally, a gift card may be "loaded" with a monetary value or a certain number of credits, and the recipient may redeem the card in a store or online as if using a credit or debit card.

A particular example of popular gift cards are the iTunes® gift cards, available from Apple Inc., which may be purchased in numerous retail locations or online and redeemed via the internet in the iTunes store, also available from Apple Inc. A traditional iTunes gift card may be purchased for a specific monetary value, at which time the card is activated, and redeemed online by entering a redemption code located on the card. The recipient may then search or browse the iTunes store for content and purchase music, movies, applications, or any number of items using the value on the gift card.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

Accordingly, the present disclosure describes customized gift cards and methods for acquiring such cards. A customized gift card may be purchased online or in a store and "preloaded" with buyer-selected downloadable content. Exemplary downloadable content may include music, videos, applications, video games, website subscriptions, podcasts, ringtones, links, and so forth. The customized gift card may be associated with the buyer-selected downloadable content via a unique identifier (e.g., a redemption code) or a pointer embedded in the card (e.g., using a radio frequency identification tag, magnetic stripe, or two-dimensional barcode). In addition to the "preloaded" content, the gift card itself may be customized. That is, the buyer may select one or more images to appear on the face of the card. The images may be cover art (e.g., album covers, movie covers, etc.), stock images, or personalized images (e.g., uploaded photos).

After the buyer has selected the downloadable content to associate with the customized gift card, the content may be paid for such that a recipient is able to download the content upon redemption of the card. Redemption may include, for example, entering the unique identifier at an online prompt, or initiating the pointer via a hardware trigger. The recipient may then download the buyer-selected content and/or exchange it for alternative content.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As downloadable content replaces traditional media, such as CDs and DVDs, it may still be desirable to present a physical object to a recipient when gifting such content. In addition, in some instances, a gift giver may prefer to customize and personalize content, such as on a "mix tape." Accordingly, there is provided a method for customizing a gift card to enable a recipient to download content pre-selected by the gift giver. The downloadable content may include, for example, music (e.g., albums, songs, custom playlists, etc.), movies (including, e.g., collections), television shows (e.g., series, seasons, episodes, etc.), applications (e.g., computer programs, phone apps, etc.), video games, website subscriptions, podcasts, ringtones, links to internet sites or blogs, and so forth. Essentially, any downloadable content may be "preloaded" onto a customized gift card.

The customized gift card may be presented to a recipient as a gift, for example, for a special occasion. In another embodiment, the customized gift card may be utilized as a promotional tool. For example, customized gift cards may be distributed at a music festival and include a sampling of music from participating artists. The customized gift card may also be used to distribute content other than music, such as, for example, a company prospectus at a corporate meeting. Recipients may access the downloadable content through the internet, and the content may be encrypted for privacy such that it is only accessible with data from the customized gift card.

Figure 1:
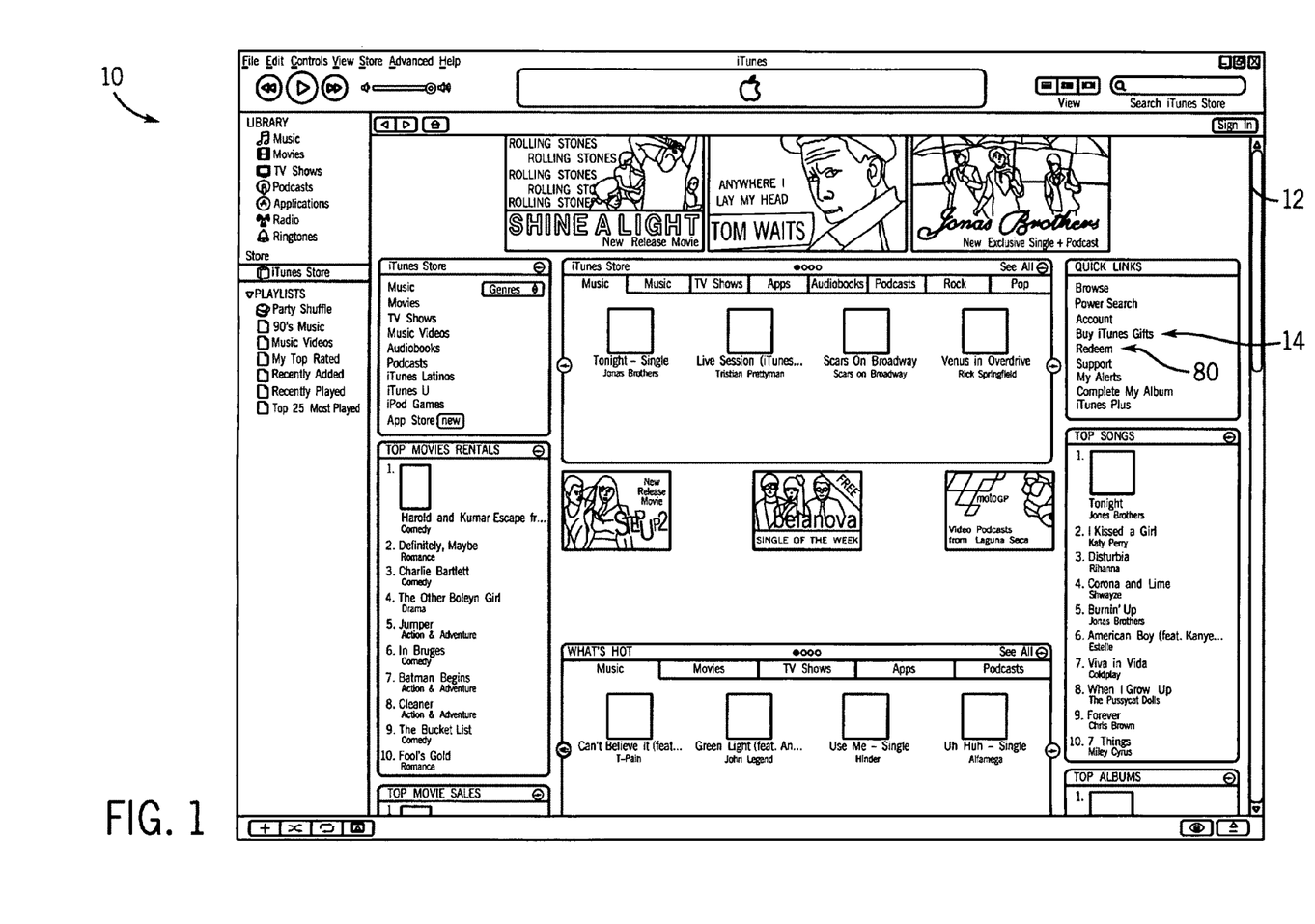
FIG. 1 is a schematic of a screen shot of an exemplary online purchasing system in accordance with certain embodiments of the present disclosure.
Figure 2:
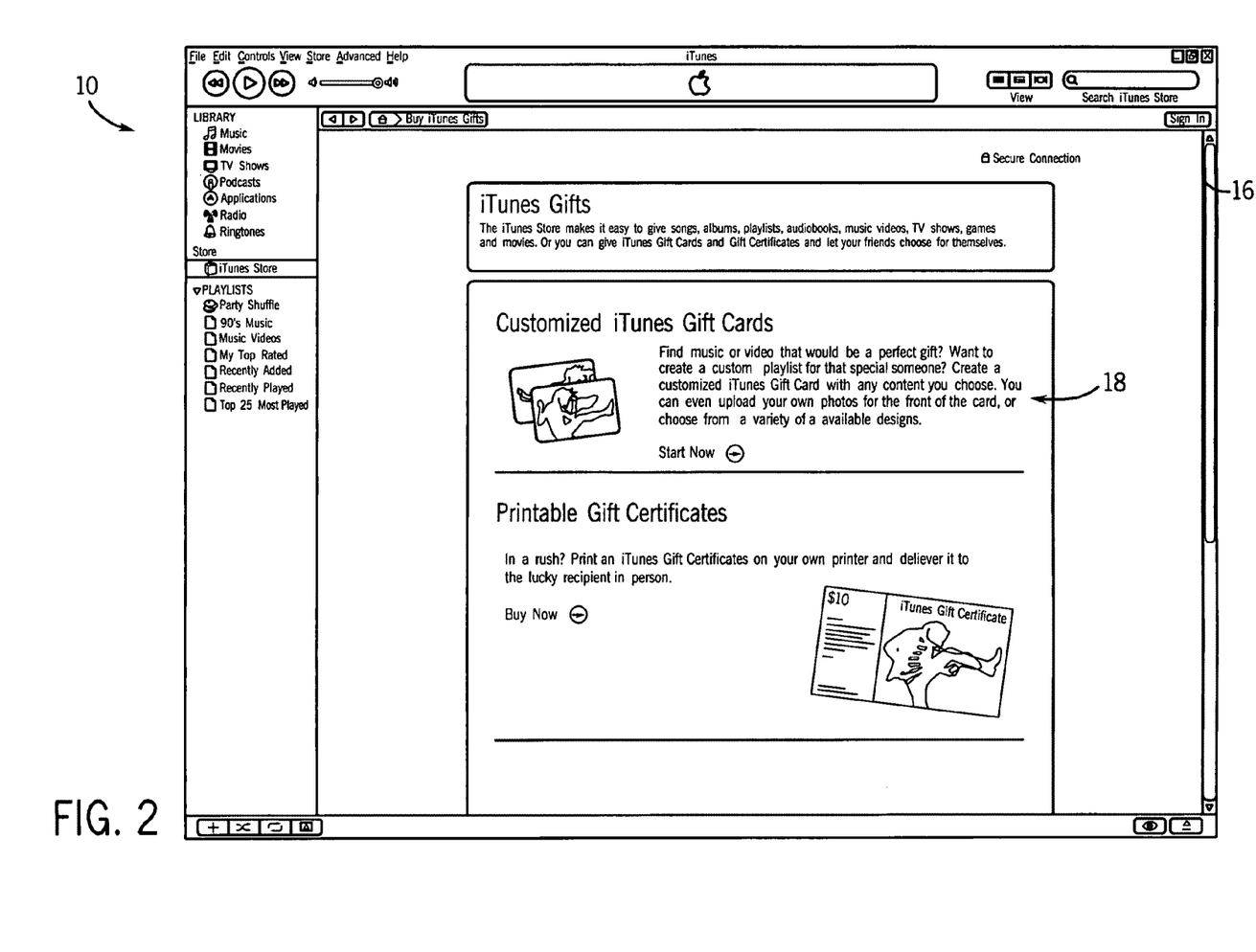
FIG. 2 is a schematic of a screen shot of exemplary gift purchasing options for the online purchasing system of claim 1 in accordance with embodiments of the present disclosure.

In an exemplary embodiment, a buyer may customize and purchase a gift card from an online content provider, such as via an internet browser or another program. For example, as illustrated in FIG. 1, the buyer may open the iTunes program, available from Apple Inc., and access the iTunes Store interface 10 to create and purchase a customized gift card. From a main screen 12, the buyer may select a gift option 14, such as "Buy iTunes Gifts." Upon selecting the gift option 14, a new screen 16, an embodiment of which is illustrated in FIG. 2, may display various gifts available for purchase. The buyer may then select a customized gift card option 18, such as "Customized iTunes Gift Cards."

Figure 3:
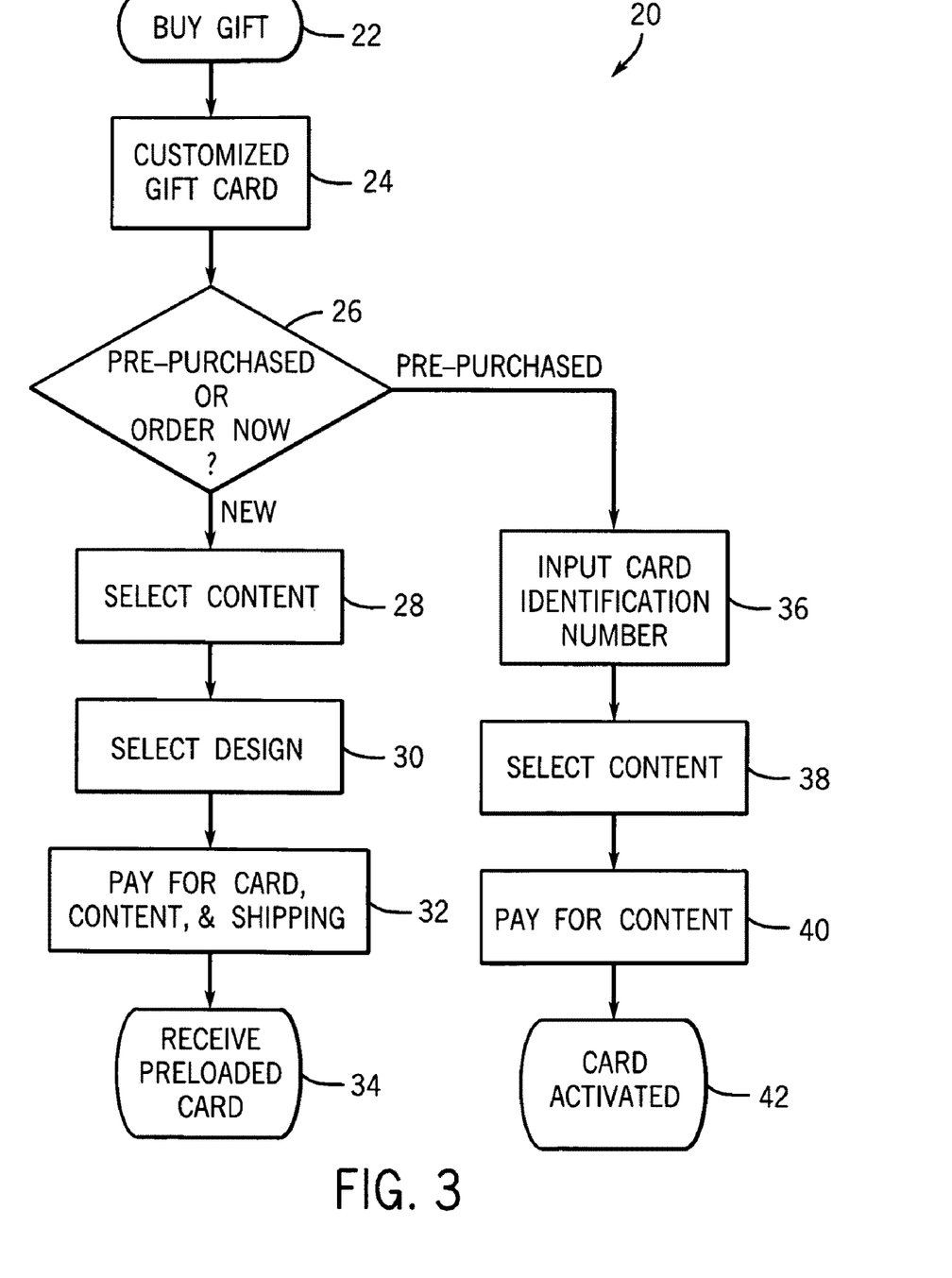
FIG. 3 is a flow chart of an exemplary method for purchasing a customized gift card in accordance with embodiments of the present disclosure.

An exemplary process 20 for purchasing a customized gift card via such screen interfaces is illustrated in FIG. 3. The process 20 may be implemented, for example, through a website via a web browser or via another program, such as iTunes, as illustrated above. It should be understood that the described steps may be implemented in any variety of combinations and/or orders. In some embodiments, one or more described steps may be omitted, while in other embodiments additional steps may be added. In a first step 22, the buyer may choose to buy a gift. If more than one type of gift is available for purchase, the buyer may select to buy a customized gift card in a step 24. The buyer may then be prompted, in a step 26, to order a card online for delivery or to use an empty card which was pre-purchased in a retail store.

If the buyer selects to order a card online, content may then be selected, or "preloaded," in a step 28. The content may include any downloadable content. The content is not stored in the card, but rather is associated with the card so that it may be downloaded upon redemption of the card. In an exemplary embodiment, the content may be music, videos, apps, ringtones, podcasts, etc. purchased from an online store, such as the iTunes Store. In another embodiment, the content may include links to private content, such as photos, home videos, documents, etc., for which the customized gift card serves as a key.

Association of the content with the gift card may be via a unique identifier (e.g. an identification code printed on the card, embedded in circuitry in the card, or stored in magnetic or optical media on the card) or another identification technique/device. The unique identifier may be associated with the buyer-selected downloadable content, for example, in an indexed database accessible online, such as the iTunes Store server. When the buyer purchases the customized gift card online, the unique identifier may be generated, associated with the selected downloadable content, and included with the gift card. For example, if the unique identifier is an alpha-numeric code, it may be printed on a face of the customized gift card. In other embodiments, the unique identifier may be a code which is embedded in circuitry within the gift card, such as a radio frequency identification (RFID) tag, or which is stored by a magnetic stripe or optical barcode provided on the card.

Figure 4:
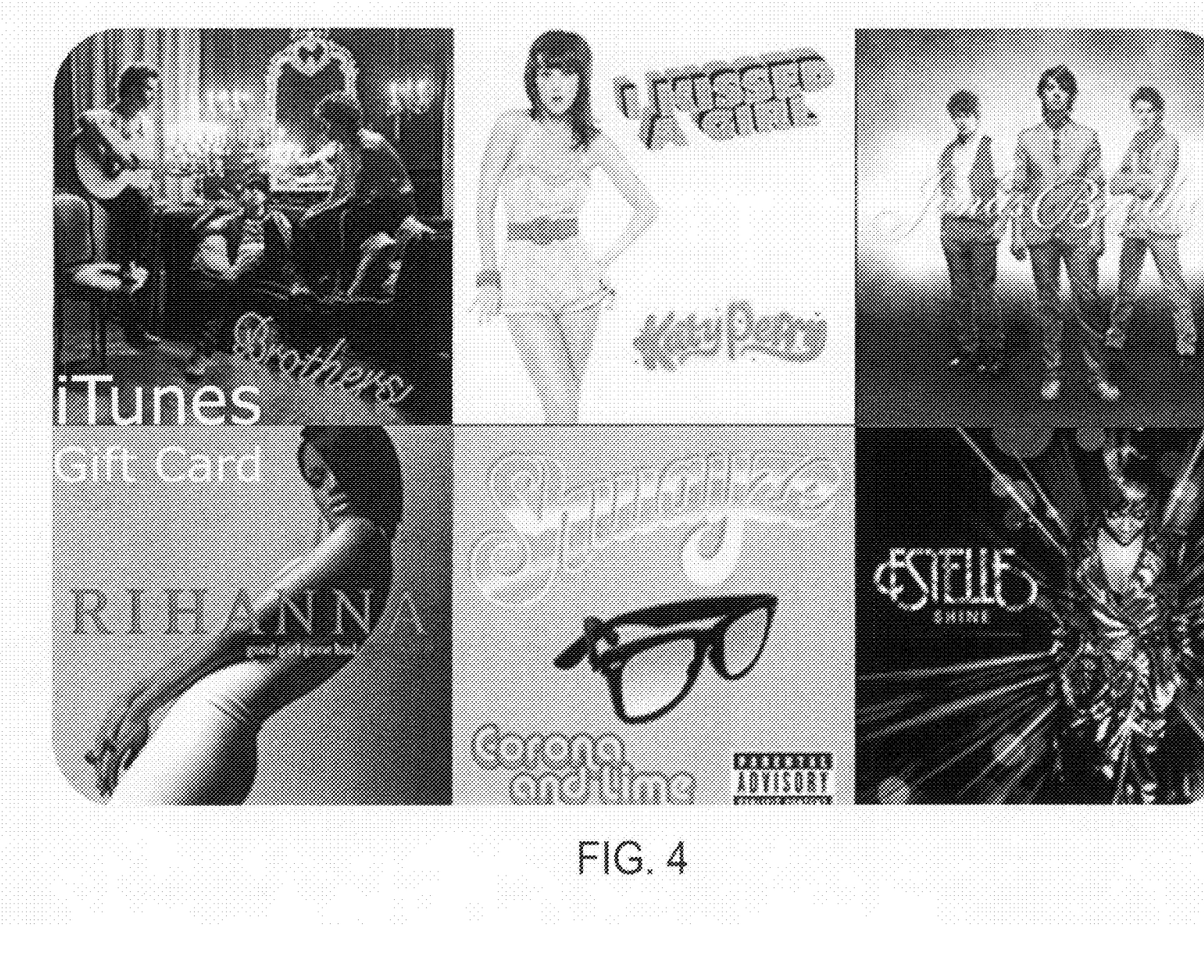
FIGS. 4-6 are images of exemplary customized gift cards in accordance with embodiments of the present disclosure.
Figure 5:
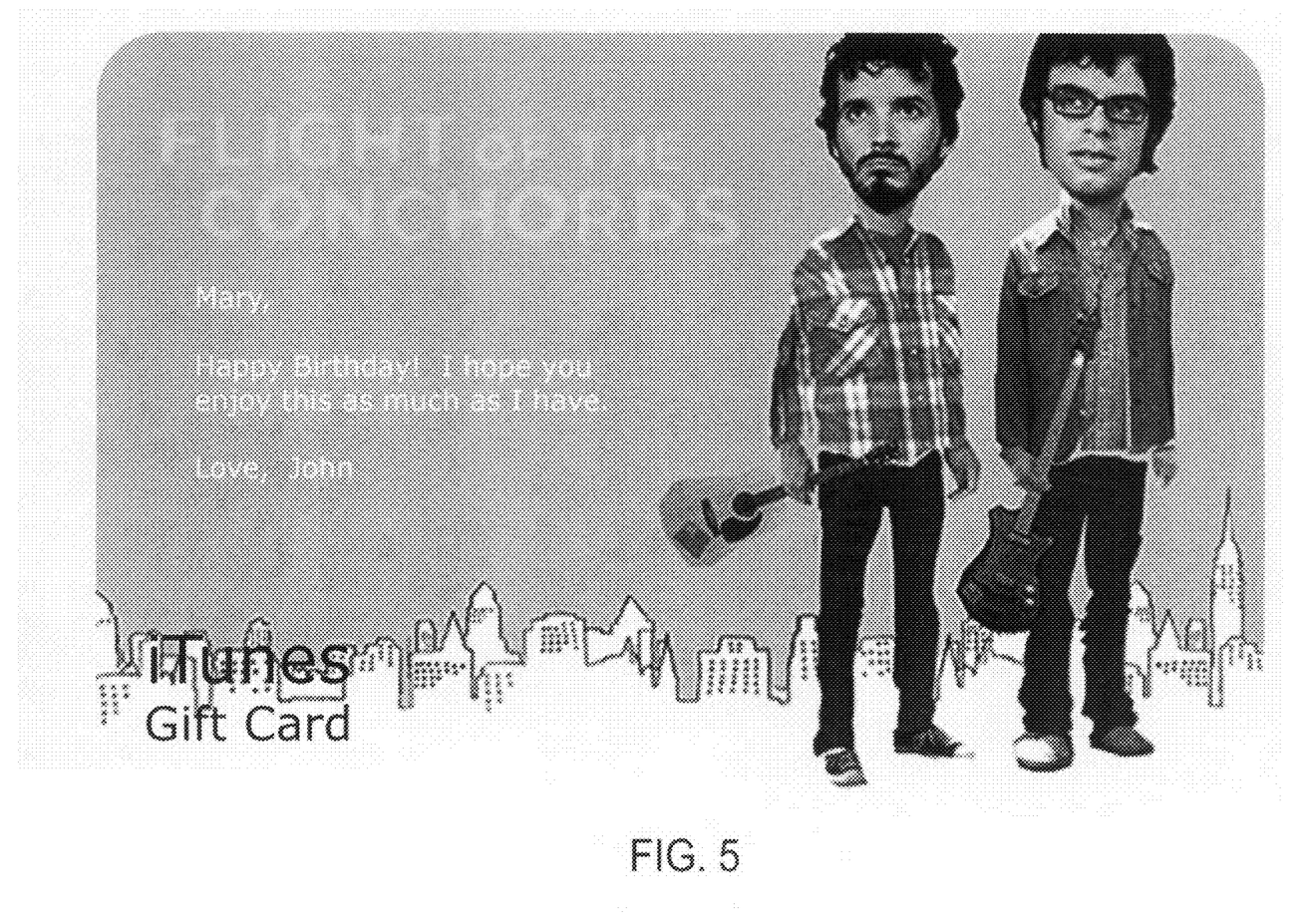
Figure 6:
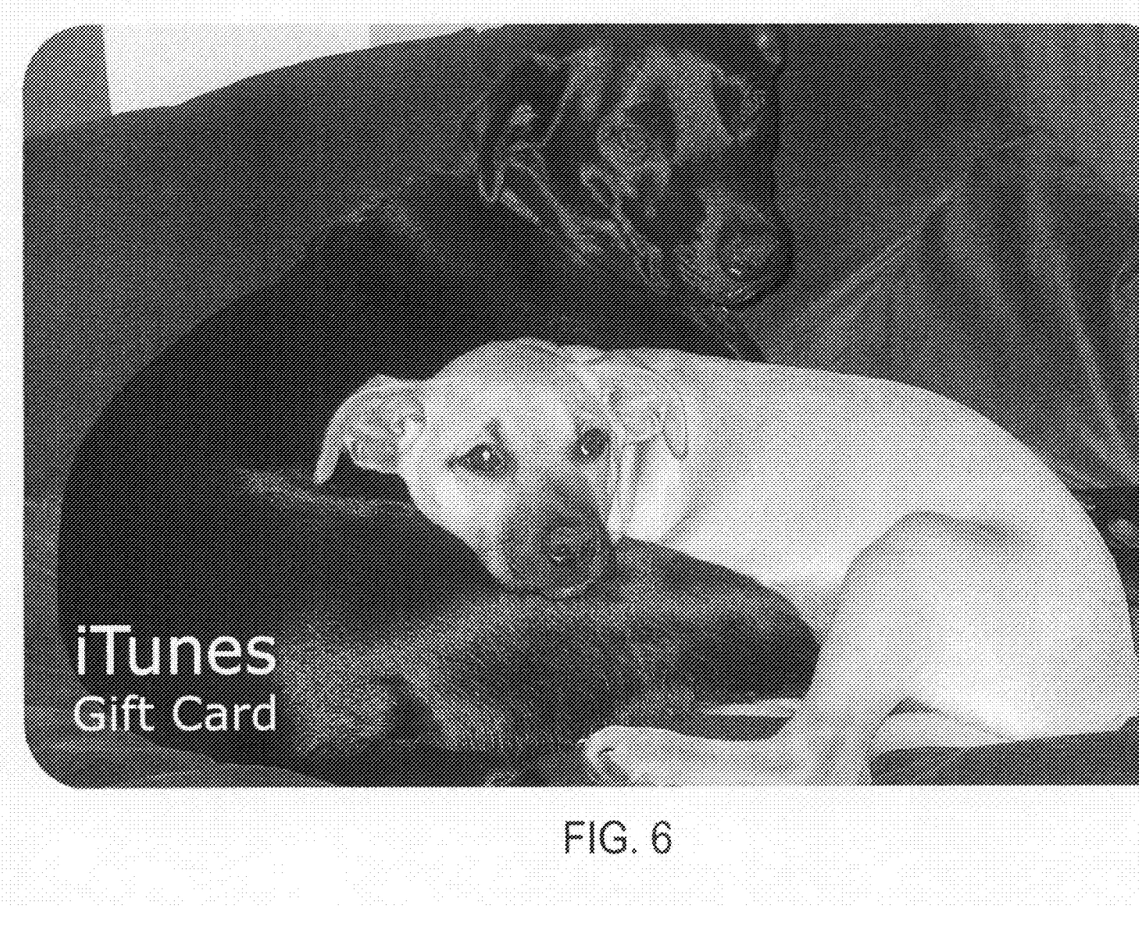

When the buyer has finished selecting content to associate with the customized gift card, the buyer may then be prompted to choose a design for the card in a step 30. Exemplary design options may include, for example, generic designs, artwork from selected content (e.g., album covers, movie or television stills, etc.), or personalized designs. The artwork, such as album or movie covers, may be presented as a collage of some or all of the content selected for the card, as illustrated in FIG. 4, or as a single picture printed as a background on the card, as illustrated in FIG. 5. The personalized design option may enable the buyer to upload a personal photo to be printed on the card, as illustrated in FIG. 6. Furthermore, the buyer may enter a personalized message to be printed on the front or back of the card, an example of which is also illustrated in FIG. 5.

Upon completion of the content selection step 28 and the card design step 30, the buyer may be prompted to pay for the card in a step 32. Payment for the card may include payment for the selected content, a fee for the card itself, and/or a shipping charge to have the card delivered via mail. In some embodiments, the card design selected in step 30 may have variable pricing, for example, if copyrighted images are used. In a step 34, the card may be delivered to the purchaser or a gift recipient, for example, via the mail or a carrier service. The recipient may then download the content "preloaded" onto the card, as described below.

In another embodiment, the buyer may opt to purchase an "empty" card in a retail store. Because the value of the card depends on the content loaded onto the card, the "empty" card may be purchased for a nominal value. In step 26, the buyer may then indicate that a card has been pre-purchased for content to be "loaded" onto it. The buyer may be prompted to identify the card in a step 36 so that the card may be associated with specified content. Identification of the card may include, for example, entering an alpha-numeric code at a prompt, or transmitting a code embedded in the card to the online provider. An embedded code may be input via an RFID reader, optical scanner, magnetic stripe reader, or other device connected to the buyer's computer, commercial kiosk, or other processor-based system. An alpha-numeric code may be located, for example, on the back of the card or on packaging for the card. In addition, a hidden code may be required to activate the card and preload content. When the card has been identified, the buyer may be prompted to select content in a step 38. The content selection step 38 may be similar or identical to the content selection step 28. The selected content and the card may be associated together using a suitable database such that identification of the card by alpha-numeric code and/or embedded code allows the associated content to be identified and provided.

In contrast to the internet-ordered card, the pre-purchased card may not include customized graphics and/or messages. Accordingly, after the buyer has selected content to associate with the gift card in step 38, the buyer may be prompted to pay for the content in a step 40. Upon paying for the content, the gift card is then activated in a step 42, and a recipient may access the website or program to download the associated content using the gift card.

An additional embodiment may enable the buyer to pre-purchase a gift card with a balance, for example, at a retail store. The balance on the card may then be applied to the content the buyer selects to "preload" onto the card. If any additional monetary or credit value remains unused after the buyer has selected the desired content, that value may remain associated with the customized gift card for the recipient to apply to future purchases.

Figure 7:
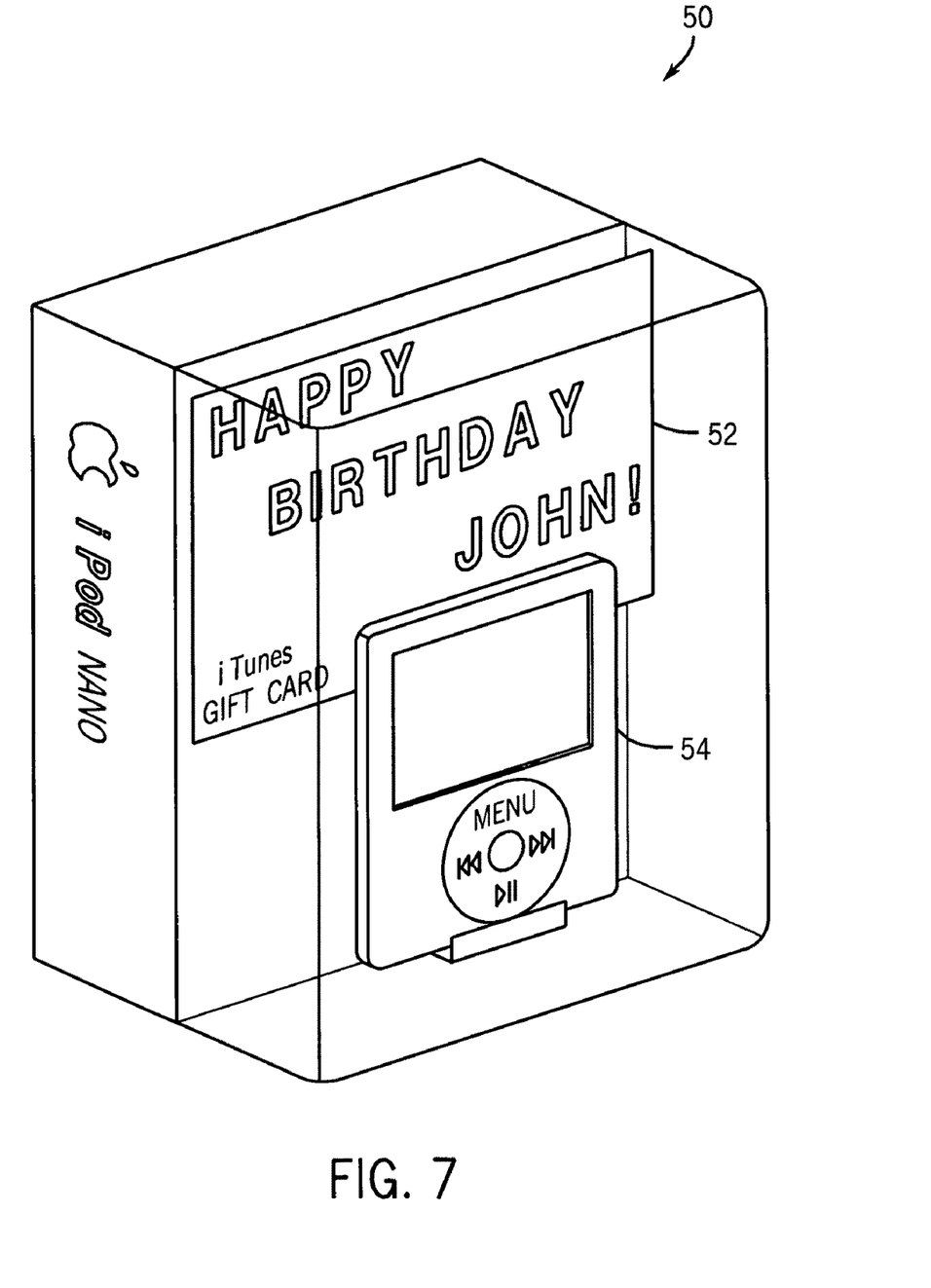
FIG. 7 is a perspective view of an exemplary customized gift card packaged with a personal media player in accordance with embodiments of the present disclosure.

A further embodiment may enable the buyer to purchase a customized gift card in association with a device for displaying/playing the downloadable content, such as personal media player (PMP) (e.g., iPod® or iPhone®, both available from Apple Inc.) or a computer. For example, as illustrated in FIG. 7, a gift set 50 may include a customized gift card 52, for example, generated as described above with respect to FIG. 3. The gift set 50 may also include a PMP 54. In one embodiment, illustrated in FIG. 7, the customized gift card 52 may be inserted into the same packaging as the personal media player 54. To facilitate this insertion, the customized gift card 52 may be sized similarly to the PMP 54 to fit within existing packaging. In another embodiment, the customized gift card 52 may be included with the PMP 54 in a shipment, such as in an envelope included in a shipping box.

Figure 8:
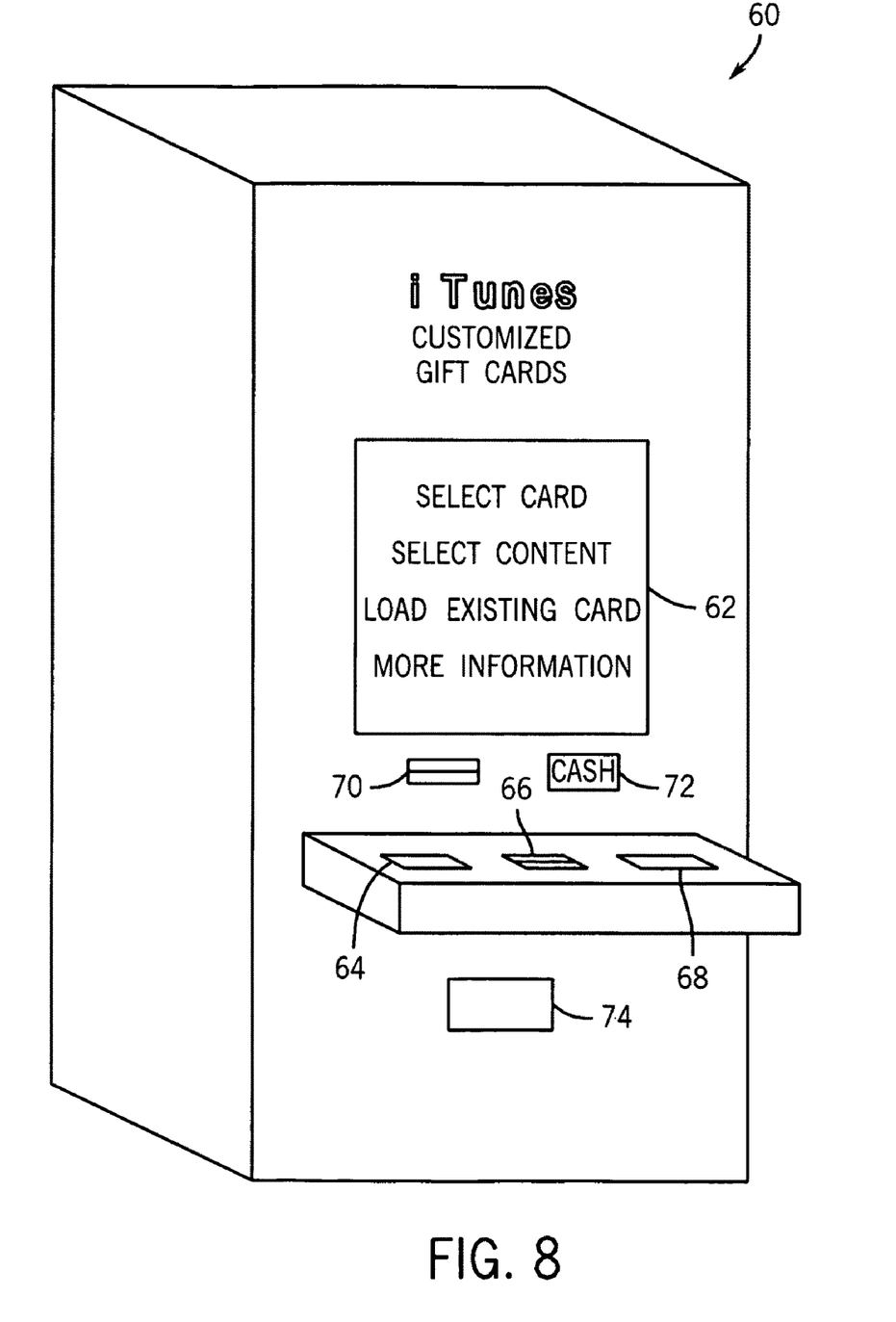
FIG. 8 is a perspective view of an exemplary customized gift card dispenser in accordance with embodiments of the present disclosure.

In another embodiment, the buyer may purchase a customized gift card via a dispenser or kiosk 60, illustrated in FIG. 8. Customized gift card kiosks 60 may be provided, for example, in retail shops, malls, grocery stores, etc. In the illustrated embodiment, the kiosk 60 may include a user interface 62 to enable the buyer to make selections, such as the gift card design and associated content. The user interface 62 may be, for example, a multi-touch screen, a touch screen, a keyboard, a mouse, etc. The buyer may select desired content to associate with the customized card then select a design for the card, as described above with respect to FIG. 3. One or more interface devices, such as a card reader 64, a USB port 66, and/or a docking station 68, may be included on the kiosk 60 to enable users to upload personalized images from other sources. For example, the buyer may insert a flash memory card (e.g., CompactFlash card, SmartMedia card, Memory Stick, Multimedia card, Secure Digital card, etc.) into the card reader 64 to upload a personalized photo for printing on the gift card. Similarly, the buyer may connect a USB device (e.g., flash drive, portable hard drive, etc.) to the USB port 66 and/or a personal media player/cellular phone to the docking station 68 to upload personal images. Once the content has been selected and the card has been designed, the buyer may pay for the card and the content, for example, via a credit card scanner 70 or a cash reception slot 72 on the kiosk 60. In another embodiment, the buyer may log into an internet-accessible account via the buyer interface 62 to pay for the gift card. The customized gift card with "preloaded" content may then be printed at the kiosk 60 and dispensed to the buyer via a card dispenser slot 74.

Figure 9:
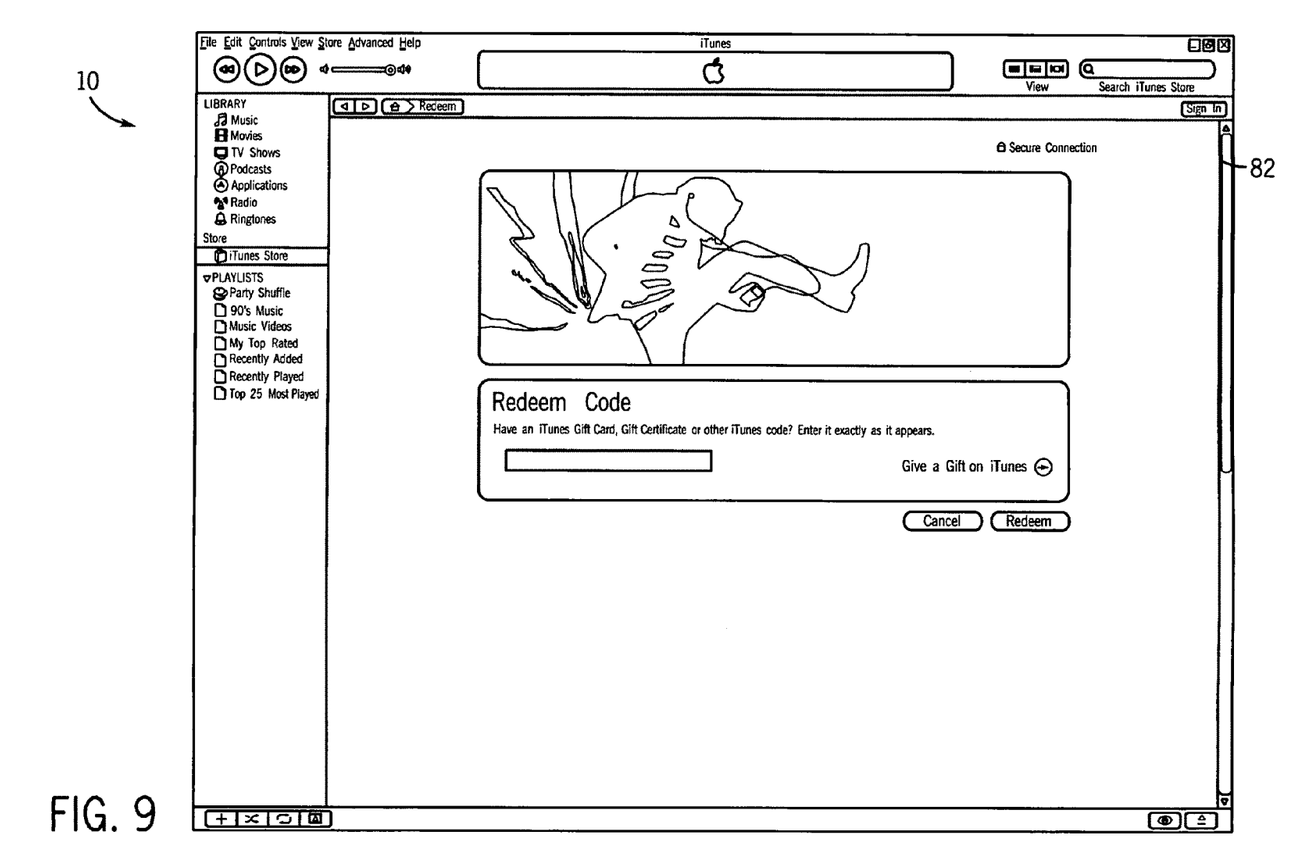
FIG. 9 is a schematic of a screen shot of an exemplary gift card redemption screen for the online purchasing system of FIG. 1 in accordance with embodiments of the present disclosure.
Figure 10:
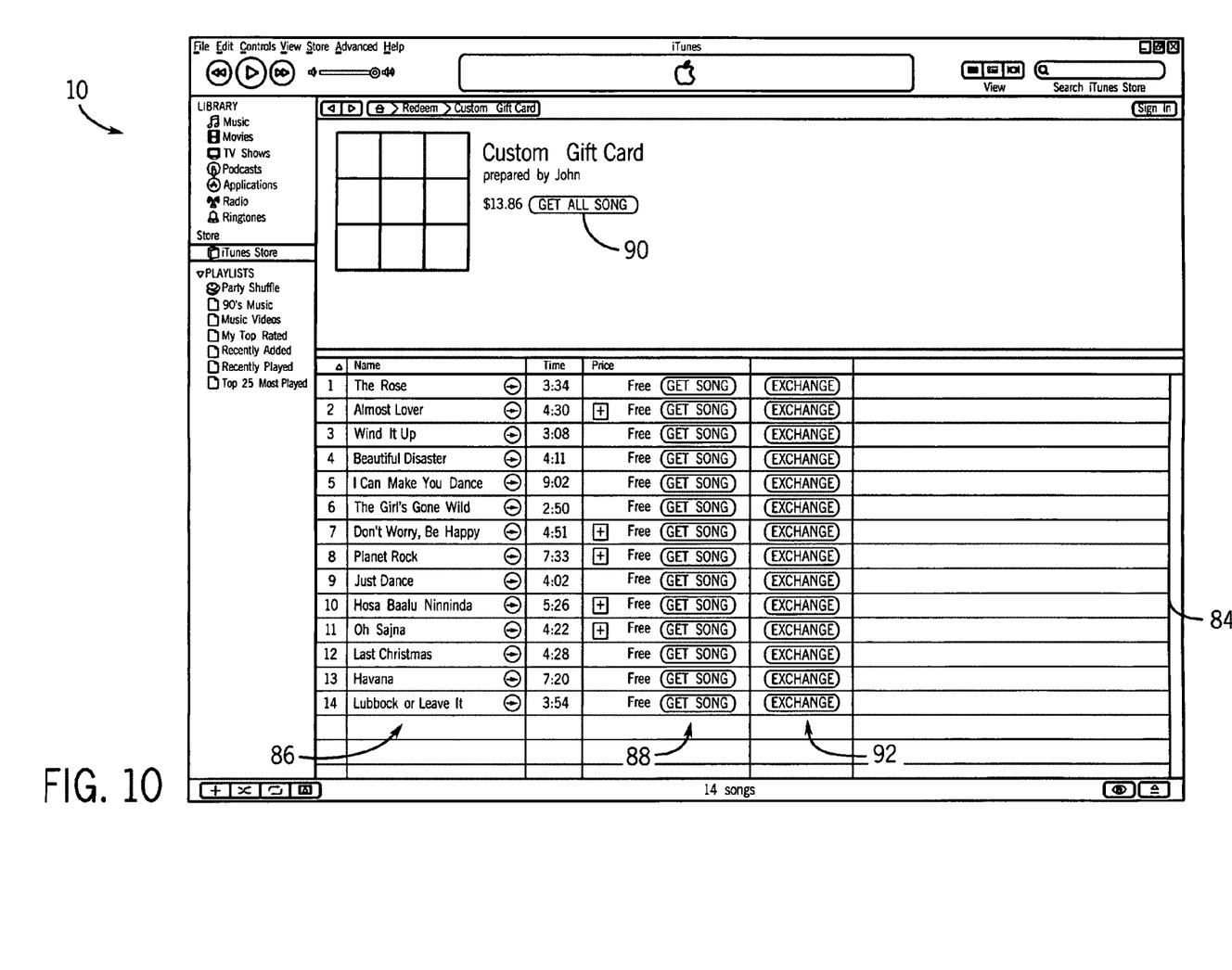
FIG. 10 is a schematic of a screen shot of an exemplary customized gift card content display in accordance with embodiments of the present disclosure.

Once a recipient has received a customized gift card, the associated content may be downloaded from the Internet. The recipient may access the website at which the content was selected, for example, via a web browser or another program, such as iTunes. For example, as illustrated in FIG. 1, the recipient may open the iTunes program and access the iTunes Store to redeem the customized gift card and download the associated content. From the main screen 12, the recipient may select a redemption option 80, such as "Redeem." Upon selecting the redemption option 80, a new screen 82, an embodiment of which is illustrated in FIG. 9, may prompt the recipient to identify the customized gift card by entering a code located on the card. The code may be associated with the gift card during the customization process, as described above, or prior to such customization. In another embodiment, the recipient may be prompted to identify the card by transmitting an identification code embedded in the customized gift card, such as by enabling a device to read an RFID tag, magnetic stripe, or barcode in or on the card. Upon identification of the card, the recipient may be presented with another screen 84, an embodiment of which is illustrated in FIG. 10, from which the downloadable content may be downloaded and/or accessed. The screen 84 may display a list 86 of the pre-purchased items for download by the recipient. The recipient may choose to download individual items, for example, by selecting a "get item" button 88, or all of the content at once, for example, by selecting a "get all items" button 90.

In some instances, a gift recipient may already own some or all of the gifted content, or the recipient may not be interested in the content selected by the gift giver. Accordingly, there may be provided a method for "exchanging" content for example, by selecting an "exchange" button 92. That is, the value of content which the recipient chooses not to download may be applied to other content available for selection by the recipient. In an exemplary embodiment, the recipient may receive a customized gift card "preloaded" with a mix of songs. The recipient may already own two of the pre-purchased songs, so rather than downloading these songs again, the recipient may choose to exchange those songs for other items. For example, the recipient may elect to choose two different songs of the same value to download; receive a credit in the value of the pre-purchased songs; download one item having the combined value of the songs; apply the value of the songs to another item and pay the difference; or any other exchange selection.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method, comprising an online tool performing the following steps:
   receiving a unique identifier identifying downloadable content selected by a buyer of a customized gift card from a plurality of downloadable content available for download via the online tool;
   determining individual downloadable items of the identified downloadable content;
   enabling a recipient of the customized gift card to exchange one or more of the individual downloadable items for alternative downloadable content, a credit, or a combination thereof prior to download of the one or more individual downloadable items;
   enabling the recipient of the customized gift card to select one or more of the individual downloadable items for download through the online tool; and
   providing the selected individual downloadable items for download upon redemption of the customized gift card by the recipient.

2. The method of claim 1, wherein receiving a unique identifier comprises receiving via a user input prompt an identification code printed on the customized gift card.

3. The method of claim 1, wherein receiving a unique identifier comprises receiving via a suitable media reader an identification code embedded in the customized gift card.

4. The method of claim 1, wherein determining individual downloadable items comprises transmitting the unique identifier to a server associated with the online tool to retrieve the individual downloadable items.

5. The method of claim 1, wherein enabling the recipient of the customized gift card to exchange one or more of the individual downloadable items comprises displaying a list of the individual downloadable items and displaying a plurality of selection buttons, wherein each of the plurality of selection buttons corresponds to one of the individual downloadable items in the list and is selectable to exchange the corresponding individual downloadable item.

6. The method of claim 1, comprising:
  receiving a user input selecting one of the individual downloadable items for exchange;
  receiving a user input selecting the alternative downloadable content to be exchanged for the selected individual downloadable item; and
  providing the alternative downloadable content for download upon redemption of the customized gift card by the recipient.

7. The method of claim 1, comprising displaying a list of the individual downloadable items and displaying a selection button that enables the recipient to select all of the individual downloadable items in the list for download.

8. The method of claim 1, wherein the downloadable content comprises music, movies, television shows, applications, video games, podcasts, or ringtones, or a combination thereof.

9. A method, comprising an online tool performing the following steps:
  determining a unique identifier that identifies a gift card;
  receiving data identifying individual downloadable items selected by a buyer of the gift card from a plurality of downloadable content available for download via the online tool upon redemption of the gift card;
  associating the data with the unique identifier;
  processing a request from a recipient of the gift card to redeem the gift card, wherein the request includes the unique identifier;
  providing a list of the individual downloadable items to be displayed in response to receiving the request;
  receiving a user input selecting one of the individual downloadable items for exchange prior to download of the selected individual downloadable item;
  receiving a user input selecting alternative downloadable content to be exchanged for the selected individual downloadable item;
  receiving a user input selecting one or more of the individual downloadable items for download via the online tool; and
  providing the alternative downloadable content and the selected individual items for download upon redemption of the customized gift card by the recipient.

10. The method of claim 9, wherein determining a unique identifier comprises receiving via a user input prompt an identification code printed on the customized gift card.

11. The method of claim 9, wherein determining a unique identifier comprises generating the unique identifier in response to receiving a customization request for the gift card.

12. The method of claim 9, wherein associating the data with the unique identifier comprises linking the individual downloadable items with the unique identifier in an online database.

13. The method of claim 12, wherein processing a request comprises retrieving the individual downloadable items from the online database using the unique identifier.

14. The method of claim 9, wherein the individual downloadable items comprise music, movies, or television shows, or a combination thereof.

15. The method of claim 9, comprising receiving one or more buyer-selected images and transmitting the one or more buyer-selected images to a production facility to produce the gift card containing the one or more buyer-selected images.

16. The method of claim 15, wherein the one or more buyer-selected images comprise artwork associated with the individual downloadable items, an uploaded image, or a combination thereof.

17. The method of claim 9, comprising displaying the library of downloadable content to facilitate selection of the individual downloadable items by the buyer.

18. A method comprising an online tool performing the following steps:
  receiving a unique identifier that identifies a content empty gift card;
  receiving data identifying individual downloadable items selected by a buyer of the gift card from a plurality of downloadable content available for download via the online tool upon redemption of the gift card;
  associating the data with the unique identifier to transform the content empty gift card into a customized content gift card;
  processing a request from a recipient of the customized content gift card to redeem the gift card, wherein the request includes the unique identifier;
  providing a list of the individual downloadable items to be displayed in response to receiving the request;
  enabling the recipient of the customized content gift card to exchange one or more of the individual downloadable items for alternative downloadable content, a credit, or a combination thereof prior to download of the one or more individual downloadable items;
  enabling the recipient of the customized content gift card to select one or more of the individual downloadable items for download through the online tool; and
  providing the selected individual downloadable items for download upon redemption of the customized content gift card by the recipient.

19. The method of claim 18, wherein receiving data comprises receiving data that identifies the individual downloadable items from a library of content available for download through the online tool.

20. The method of claim 18, wherein associating the data with the unique identifier comprises linking the individual downloadable items with the unique identifier in an online database.

21. The method of claim 18, wherein the individual downloadable items comprise music, movies, or television shows, or a combination thereof.

22. The method of claim 18, wherein enabling the recipient of the customized content gift card to exchange one or more of the downloadable items comprises enabling the recipient to exchange selected individual downloadable items for alternative downloadable items of a similar value.

23. The method of claim 18, wherein enabling the recipient of the customized content gift card to exchange one or more of the downloadable items comprises enabling the recipient to exchange selected individual downloadable items for a credit that can be applied to future purchases from the plurality of downloadable content.

24. The method of claim 18, comprising determining that an additional value is included on the customized content gift card and enabling the recipient to apply the additional value to future purchases from the plurality of downloadable content.

* * * * *